(12) United States Patent
Russ

(10) Patent No.: US 12,575,554 B2
(45) Date of Patent: Mar. 17, 2026

(54) METHODS, SYSTEMS AND APPARATUS TO EXTRACT ONE OR MORE WEEDS

(71) Applicant: Robert J. Russ, Pensacola, FL (US)

(72) Inventor: Robert J. Russ, Pensacola, FL (US)

(*) Notice: Subject to any disclaimer, the term of this patent is extended or adjusted under 35 U.S.C. 154(b) by 754 days.

(21) Appl. No.: 17/884,690

(22) Filed: Aug. 10, 2022

(65) Prior Publication Data

US 2024/0049699 A1    Feb. 15, 2024

(51) Int. Cl.
*A01M 21/02*    (2006.01)
*A01B 1/16*    (2006.01)

(52) U.S. Cl.
CPC ............... *A01M 21/02* (2013.01); *A01B 1/16* (2013.01)

(58) Field of Classification Search
CPC ......... A01M 21/00; A01M 21/02; A01C 5/02; A01B 33/04; A01B 33/085; A01B 1/165; A01B 1/18; A01B 1/16; A01B 1/065; A01B 39/18; A01B 39/19
See application file for complete search history.

(56) References Cited

U.S. PATENT DOCUMENTS

| | | | | | | |
|---|---|---|---|---|---|---|
| 385,324 | A | * | 6/1888 | Seller | ....................... | A01C 5/02 |
| | | | | | | 111/99 |
| 500,476 | A | * | 6/1893 | Douthit | .................... | A01C 5/02 |
| | | | | | | 111/99 |
| 1,842,903 | A | * | 1/1932 | Falk | ........................ | A01B 1/16 |
| | | | | | | 30/310 |
| 1,947,785 | A | * | 2/1934 | Lipscomb | ................ | A01B 1/16 |
| | | | | | | 30/310 |
| 2,082,476 | A | * | 6/1937 | Allen | ........................ | A01B 1/14 |
| | | | | | | 172/25 |
| 2,738,580 | A | * | 3/1956 | Rice | ........................ | A01G 20/30 |
| | | | | | | 408/124 |
| 2,855,668 | A | * | 10/1958 | Ottenad | ................... | A01B 1/16 |
| | | | | | | 175/170 |
| 2,917,826 | A | * | 12/1959 | Pohr | ........................ | A01G 3/062 |
| | | | | | | 56/295 |
| 3,444,934 | A | * | 5/1969 | Alberto | ................... | A01B 1/16 |
| | | | | | | 172/720 |
| 3,554,293 | A | * | 1/1971 | Aman | .................... | A01G 20/30 |
| | | | | | | 172/13 |
| 4,213,504 | A | * | 7/1980 | Schneider | .............. | A01B 33/06 |
| | | | | | | 172/41 |

(Continued)

FOREIGN PATENT DOCUMENTS

| | | | | | | |
|---|---|---|---|---|---|---|
| CH | | 598741 | A | * | 5/1978 | ........... A01B 39/085 |
| DE | 202013007321 | U1 | * | 12/2013 | ............... A01B 1/10 |

(Continued)

*Primary Examiner* — Adam J Behrens

(74) *Attorney, Agent, or Firm* — Faegre Drinker Biddle & Reath LLP

(57) ABSTRACT

Methods and apparatus have been disclosed for extracting one or more weeds from the soil. An embodiment includes a shaft including a first end and a second end, the first end of the shaft configured to be attached to a rotatable chuck. The apparatus also includes a cutter including a first face and a second face, the first face of the cutter attached to the second end of the shaft, the first face and the second face forming a regular shape including a plurality of vertices. Additionally, the apparatus includes a stabilizer including a base, the base of the stabilizer attached to the second face of the cutter, the stabilizer having a triangular cross-section.

20 Claims, 4 Drawing Sheets

(56)                References Cited

U.S. PATENT DOCUMENTS

| 4,501,332 | A | | 2/1985 | Straayer | |
| 4,723,802 | A | * | 2/1988 | Fambrough | A01B 1/16 |
| | | | | | 175/385 |
| 4,819,736 | A | * | 4/1989 | Hedgepeth | A01B 1/16 |
| | | | | | 294/55.5 |
| 5,060,997 | A | * | 10/1991 | Plecki | A01B 1/16 |
| | | | | | 294/50.6 |
| 5,133,269 | A | * | 7/1992 | Charneski | A01C 5/02 |
| | | | | | 175/21 |
| 5,560,434 | A | | 10/1996 | Janik | |
| 5,988,292 | A | * | 11/1999 | Knotts | A01B 1/065 |
| | | | | | 172/41 |
| 6,032,442 | A | * | 3/2000 | Paolo | A01D 34/84 |
| | | | | | 56/13.6 |
| 6,050,344 | A | * | 4/2000 | Larson | A01B 1/16 |
| | | | | | 172/378 |
| 6,293,350 | B1 | * | 9/2001 | Paolo | A01D 34/416 |
| | | | | | 56/12.2 |
| 6,352,122 | B1 | * | 3/2002 | Love | A01B 1/00 |
| | | | | | 172/532 |
| 6,595,298 | B1 | * | 7/2003 | Crady | A01B 1/065 |
| | | | | | 172/111 |
| 6,615,928 | B2 | * | 9/2003 | Dueitt | A01B 1/065 |
| | | | | | 30/165 |
| 6,736,217 | B2 | * | 5/2004 | Brown | A01B 1/065 |
| | | | | | 172/111 |
| 6,955,227 | B1 | | 10/2005 | Motosko | |
| 7,347,276 | B2 | * | 3/2008 | Basek | A01B 1/14 |
| | | | | | 16/444 |
| 8,613,326 | B2 | * | 12/2013 | Pare | A01B 1/165 |
| | | | | | 111/96 |
| 8,820,426 | B2 | * | 9/2014 | Lv | A01B 1/16 |
| | | | | | 172/41 |
| D778,695 | S | * | 2/2017 | Marken | D8/8 |
| 10,257,971 | B2 | * | 4/2019 | Kittelson | A01B 33/085 |
| 10,327,371 | B2 | * | 6/2019 | Smith, Jr. | A01B 1/165 |
| 2003/0066663 | A1 | * | 4/2003 | McKill | A01B 1/065 |
| | | | | | 172/111 |
| 2008/0011497 | A1 | * | 1/2008 | Catlin | A01B 1/065 |
| | | | | | 172/699 |
| 2010/0230123 | A1 | * | 9/2010 | Ortiz | A01B 1/00 |
| | | | | | 172/41 |
| 2015/0264854 | A1 | * | 9/2015 | Meadows | A01C 5/02 |
| | | | | | 172/371 |
| 2022/0346298 | A1 | * | 11/2022 | Davis | A01B 1/16 |

FOREIGN PATENT DOCUMENTS

| GB | 2426174 | A | * | 11/2006 | A01B 1/18 |
| GB | 2457290 | A | * | 8/2009 | A01M 21/043 |

* cited by examiner

100

102

104

106

112

114

110

108

METHODS, SYSTEMS AND APPARATUS TO EXTRACT ONE OR MORE WEEDS

FIELD OF DISCLOSURE

The invention disclosed herein generally relates to hand tools and, more particularly, relates to methods, systems, and apparatus to extract one or more weeds from the soil.

BACKGROUND

Homeowners have long sought to remove weeds and other undesired plants from their yards. One approach includes the use of pesticides and other chemicals to remove undesired plants. However, the use of such chemicals can have adverse effects on the health of desired plants and/or the health of the user. Additionally, in some residential areas, restrictive covenants prohibit the use of such chemicals.

Other approaches have relied on hand tools to remove undesired plants. However, these approaches can be time consuming, can adversely affect desired plants, and/or can be physically taxing for some users (e.g., the elderly, the disabled or debilitated, etc.). For, conventional tools may remove additional soil from the ground when removing the undesired plant which can impact the health of desired plants. Additionally, using conventional hand tools can cause knee pain for some users. As such, some users prefer hand tools that allow them to reduce the physical tax of using the hand tool (e.g., the tool allows the user to remain standing).

Some existing hand tools are operated by stepping on a peg that pushes pointed prongs into the ground above an undesired plant. The user may then manually twist and extract the tool from the ground, with the plant in tow. For such a tool, the weed may be removed after extraction via a release lever. This approach is satisfactory for large undesired plants but does not work well with comparatively smaller undesired plants. Additionally, this approach is time consuming because the user must push the tool into the ground and manually twist the tool to remove each undesired plant.

Other approaches rely on rotary weed extractors utilizing a cordless electric drill. Such approaches include spin undesired plants utilizing wings, pins, augers, and blades among other tools. The below-referenced United States (U.S.) patents describe such tools. The disclosures of all the below referenced prior U.S. patents in their entireties are hereby expressly incorporated by reference into the present application for purposes including, but not limited to, indicating the background of the present invention and illustrating the state of the art.

U.S. Pat. No. 10,257,971 describes a drill attachment for tilling soil that includes a till plate having a plurality of teeth. This patent also describes a weed-out tool that includes two teeth that extend down and away from the planar base of the weed-out tool. The tips of the teeth are tilted inward toward the center of the weed-out tool and sever the roots of the weed before the weed is extracted from the soil. However, this patent does not describe a flat, multi-point star shaped cutter with one face attached to the end of a rotatable shaft and with the other face attached to a stabilizer having a triangular cross-section.

U.S. Pat. No. 6,955,227 describes a drill attachment for auguring or mixing that has at least one spiraled disc. The at least one spiraled disc has a leading edge and a trailing edge and is flexed to form the angle ß. This patent describes that the at least one spiraled disc may be used with a powered weed trimming tool. However, this patent does not describe a flat, multi-point star shaped cutter with one face attached to the end of a rotatable shaft and with the other face attached to a stabilizer having a triangular cross-section.

U.S. Pat. No. 5,560,434 describes a cutting hoe containing a star-shaped (i.e., a four pointed Star-shaped configuration) cutting head. The cutting head has four pointed portions, and two angled sides with each of the two sides forming an obtuse angle greater than 100 degrees. However, this patent does not describe a flat, multi-point star shaped cutter with one face attached to the end of a rotatable shaft and with the other face attached to a stabilizer having a triangular cross-section.

U.S. Pat. No. 4,501,332 describes replacing the string head of string-type weed cutter with a weeder/cultivator element. The weeder/cultivator element is an inverted disc that is attached to the drive shaft of the string-type weed cutter. In operation the disc is tipped (for harder soil) or laid flat (for softer soil) against the earth. The operator can force the inverted disc into the soil where it churns weeds about to be removed and their roots. However, this patent does not describe a flat, multi-point star shaped cutter with one face attached to the end of a rotatable shaft and with the other face attached to a stabilizer having a triangular cross-section.

OBJECTS OF DISCLOSURE

The presently disclosed methods, systems, and apparatus solve inadequacies of existing technology by providing a shaft including a first end and a second end, the first end of the shaft configured to be attached to a rotatable chuck. As disclosed herein also include a cutter including a first face and a second face, the first face of the cutter attached to the second end of the shaft, the first face and the second face forming a regular shape including six vertices. Disclosed methods, systems, and apparatus also provide a stabilizer including a base, the base of the stabilizer attached to the second face of the cutter, the stabilizer having a triangular cross-section. It is an object of the embodiments disclosed herein to provide a hand tool that allows a user to effectively operate the hand tool while standing. Additionally, it is an object of disclosed methods, systems, and apparatus to effectively remove undesired plants from the ground. Another object of embodiments disclosed herein is to remove undesired plants quickly as compared to conventional tools. An object of the embodiments disclosed herein is to operate on large undesired plants, comparatively smaller undesired plants, and/or undesired plants of any size therebetween. Additionally, an object of disclosed methods, systems, and apparatus is that such methods, systems, and apparatus are affordable to manufacture.

Additional objects of disclosed methods, systems, and apparatus include slicing through soil to a desired depth to get beneath an undesired plant in an efficient and effective manner. Another object of disclosed methods, systems, and apparatus is to simplify undesired plant removal while improving the effectiveness of such removal. An object of embodiments disclosed herein is to remove undesired plants while disturbing a reduced amount of soil as compared to existing technologies. Another object of disclosed embodiments is to reduce complications associated with removing debris that may tangle around a weed removal tool.

These and other aspects and objects of s disclosed herein will be better appreciated and understood when considered in conjunction with the following description and the accompanying drawings. It should be understood, however, that the following description is illustrative and not limiting.

Many changes and modifications may be made within the scope of disclosed methods, systems, and apparatus without departing from the spirit thereof, and disclosed methods, systems, and apparatus include all such modifications.

SUMMARY

Embodiments are disclosed for extracting one or more weeds. An apparatus includes a shaft including a first end and a second end, the first end of the shaft configured to be attached to a rotatable chuck. The apparatus also includes a cutter including a first face and a second face, the first face of the cutter attached to the second end of the shaft, the first face and the second face forming a regular shape including six vertices. Additionally, the apparatus includes a stabilizer including a base, the base of the stabilizer attached to the second face of the cutter, the stabilizer having a triangular cross-section.

DETAILED DESCRIPTION

In the below description and the accompanying drawing (s), the same reference numbers have be used to refer to the same or like parts, elements, etc.

Figure 1:
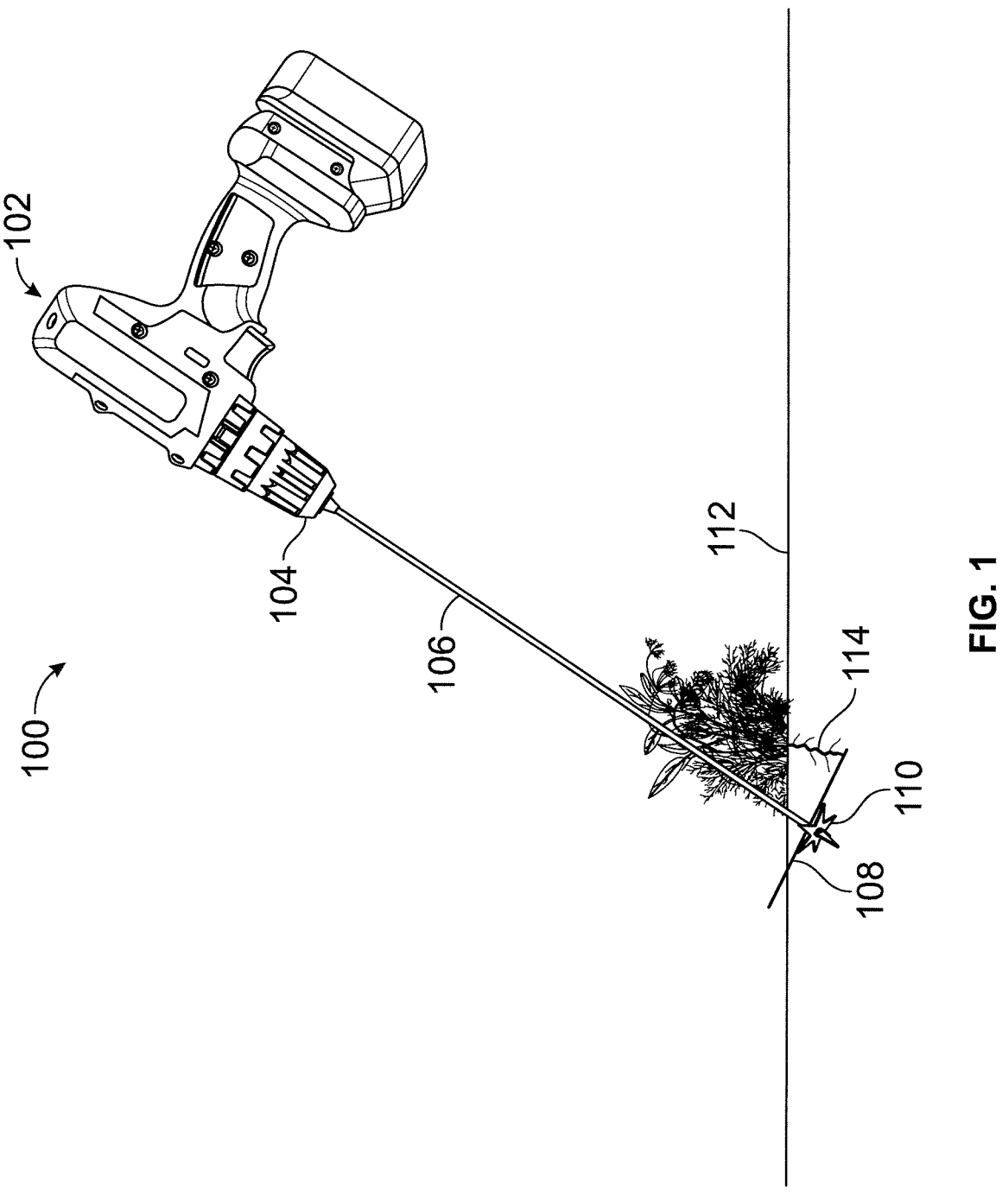
FIG. 1 is a graphical schematic illustration of an embodiment rotary weed extractor in accordance with the present invention.

FIG. 1 is a graphical schematic illustration of a rotary weed extractor 100. the rotary weed extractor 100 includes a power tool 102, a chuck 104, a shaft 106 rotatably driven by power tool 102, a cutter 108 attached to an end of shaft 106, and a stabilizer 110 attached to the underside of cutter 108. The embodiment of FIG. 1 also illustrates shaft 106, cutter 108 and stabilizer 110 extending into soil 112, and an undesired plant 114.

Figures 2A, 2B:
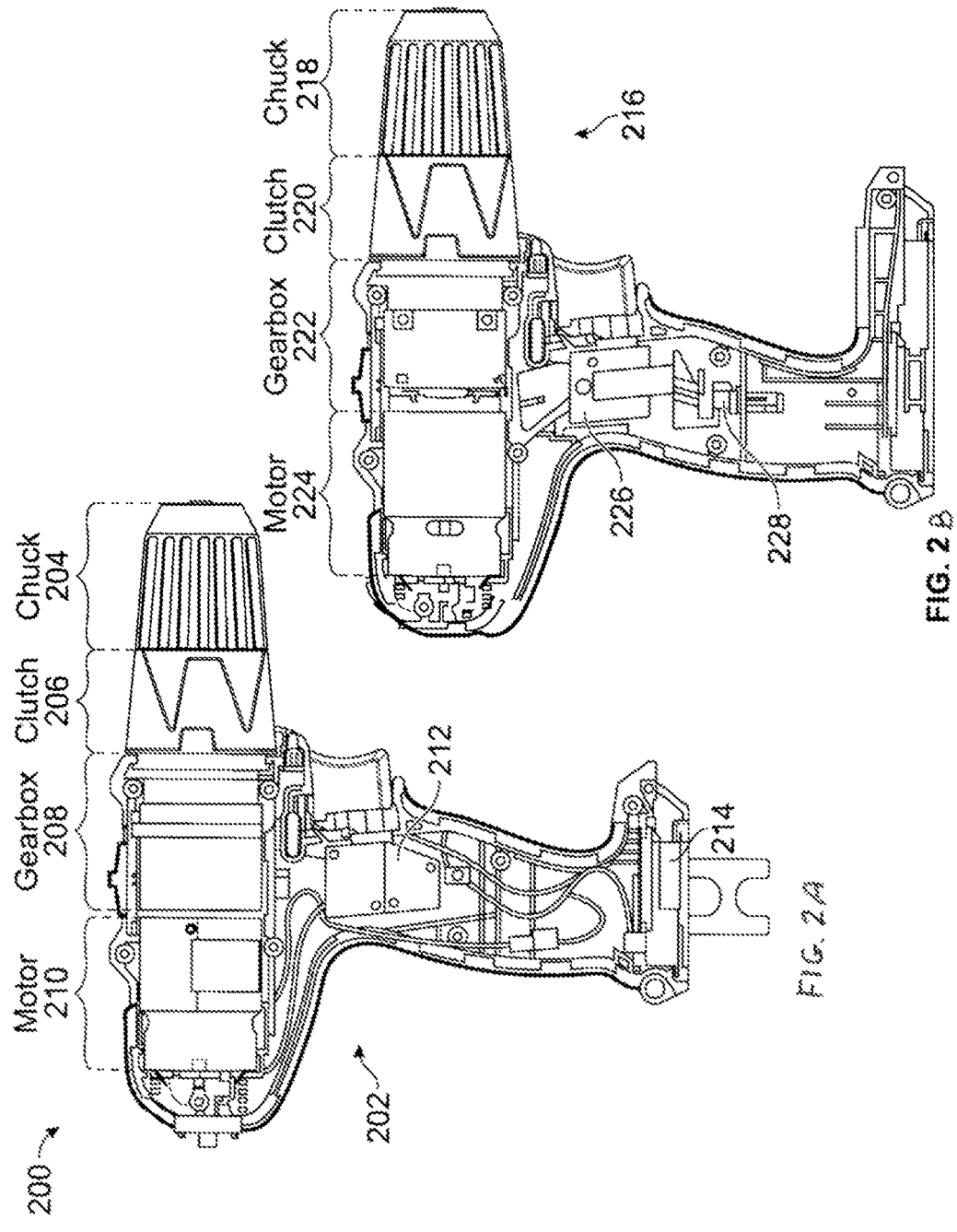
FIGS. 2A and 2B are sectional views illustrating two possible implementations of the power tool of FIG. 1 as a cordless electric drill.

In the illustrated embodiment of FIG. 1, the power tool 102 may be implemented by a cordless electric drill (e.g., battery powered) or power drill that is supplied by a cord coupled to an outlet. FIGS. 2A and 2B are sectional diagrams 200 and 201 illustrating two possible implementations of the power tool 102 of FIG. 1 as a cordless electric drill. Turning to FIG. 2A, the sectional diagram 200 includes a first power drill 202. The first power drill 202 includes a first chuck 204, a first clutch 206, a first gearbox 208, a first power source 210, a first trigger 212, and a first battery connector 214.

In FIG. 2B, the sectional diagram 201 includes a second power drill 216. The second power drill 216 includes a second chuck 218, a second clutch 220, a second gearbox 222, a second power source 224, a second trigger 226, and a second battery connector 228. For purposes of clarity, the components of the second power drill 216 (e.g., the second chuck 218, the second clutch 220, the second gearbox 222, the second power source 224, the second trigger 226, and the second battery connector 228) are similar to first power drill 202 and are not discussed further herein, except when the description thereof differs from that of the first chuck 204, the first clutch 206, the first gearbox 208, the first power source 210, the first trigger 212, and/or the first battery connector 214.

In the illustrated embodiment of FIG. 2A, the first power drill 202 includes first chuck 204, including a clamp configured to hold a radially symmetric object using jaws as is known in the art. The jaws of the first chuck 204 may be tightened or loosened by rotating the exterior cylinder of the first chuck 204 and driving the first power drill 202 forward (to tighten) or backwards (to loosen). The first chuck 204 is configured to receive a tool and/or portion of a tool, such as an end of the shaft 106 (FIG. 1). The first chuck 204 is attached (e.g., mechanically) to the first clutch 206. The first chuck 204 is a rotatable chuck that may be rotated.

Referring to FIG. 1, as described above, the power tool 102 may be implemented by a cordless, electric hand drill that may be utilized by a user to rotate the shaft 106, the cutter 108, and the stabilizer 110. In the embodiment of FIG. 1, the shaft 106 comprises a round steel rod including a first end and a second end. The first end of the shaft 106 is configured to be inserted into and firmly held by chuck 104. The second end of the shaft 106 is attached to the cutter 108.

Figure 7:
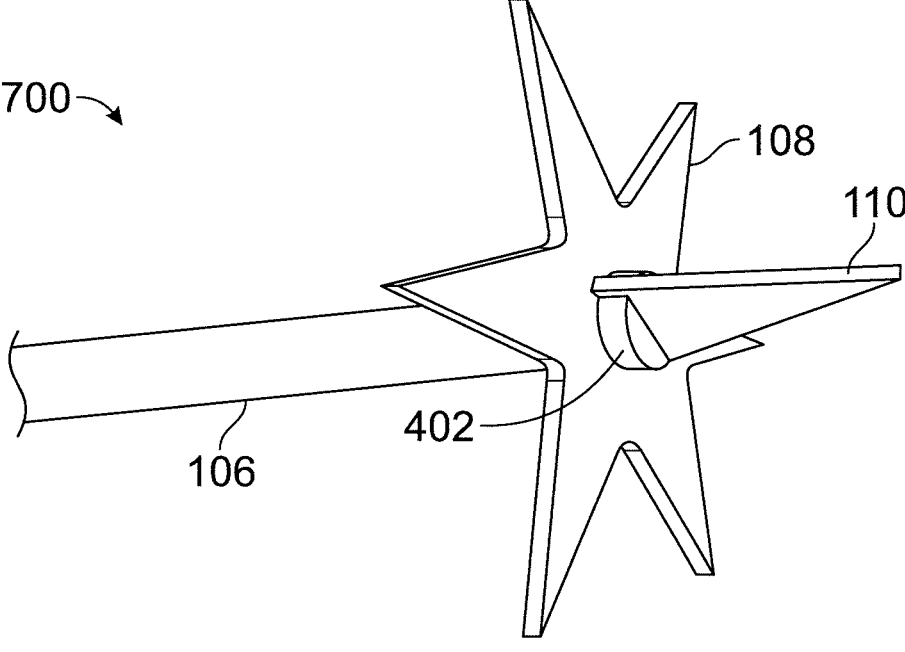
FIG. 7 is a perspective view of an embodiment assembly of the shaft, cutter, and stabilizer of FIG. 1 and/or FIG. 3.

The cutter 108 comprises a multi-pointed metal star (FIGS. 4, 5, and 7) configured to slice into the soil 112 at an angle determined by a user utilizing the power tool 102. For example, a user of the power tool 102 may place the cutter 108 into the soil 112 at an angle, and rotate the cutter 108 into the soil 112 until the cutter 108 is at a first position (e.g., a desired depth) in the soil 112 that is beneath the undesired plant 114. In this manner, the cutter 108 gets below the undesired plant 114 and to the root(s) of the undesired plant 114 so that the user may extract the cutter 108 from the soil 112 and bring the undesired plant upward out of the soil with the cutter 108. In FIG. 1, the cutter 108 includes a first face and an opposed second face. The first face of the cutter 108 is attached to the second end of the shaft 106. The second face of the cutter 108 is attached to the stabilizer 110. In the embodiment of FIG. 1, the first face of the cutter 108 and the second face of the cutter 108 form a regular shape including six vertices such as a Marian star.

Figure 3:
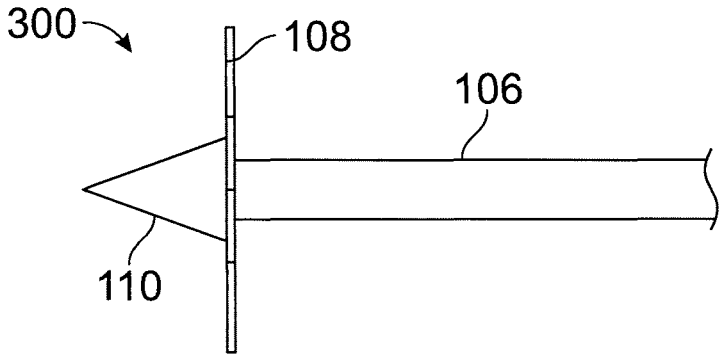
FIG. 3 is a side view of the shaft, the cutter, and the stabilizer of the rotary weed extractor.
Figure 4:
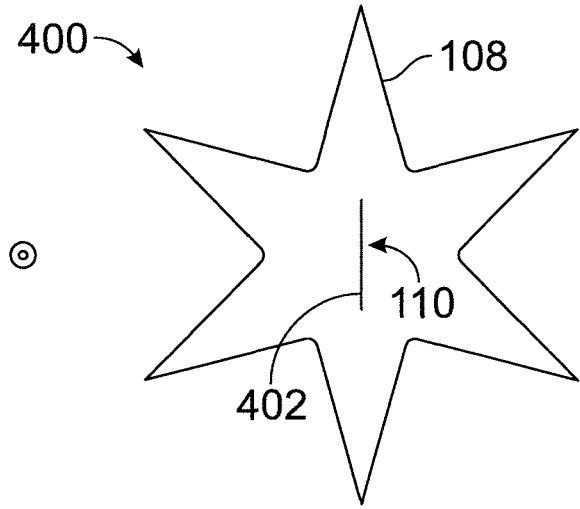
FIG. 4 is a bottom-side view illustrating the cutter and stabilizer of FIG. 1 and/or FIG. 3.

In the illustrated embodiment of FIGS. 1, 3 and 4, the stabilizer 110 is a flat, pointed piece of metal that is configured to cut into the soil 112 and deter the cutter 108 from moving laterally within the soil 112. The stabilizer 110 includes a base and has a triangular cross-section (FIG. 3). The base of the stabilizer 110 is attached to the second face of cutter 108.

As illustrated in FIG. 1, the undesired plant 114 is a common weed. In other situations, the undesired plant 114 may be any other plant and/or any other type of plant. As can be seen in FIG. 1, when a user operates the rotary weed extractor 100, the cutter 108 gets under the root(s) of the undesired plant 114 and effectively retrieves the entire undesired plant 114 from the soil 112.

In operation, a user places the stabilizer 110 on the top of the soil 112 at an angle at the side of the undesired plant 114, assuming the undesired plant 114 is a comparatively large weed. The user activates the power tool 102 to rotate the cutter 108 such that the cutter 108 slices into the soil 112 to a first position in the soil 112 (e.g., a desired depth). For example, the user can rotate the cutter 108 such that the cutter 108 is close to and below a depth of the root of the undesired plant 114. In this manner, the user can pull the power tool 102 upward, extracting the cutter 108 from the soil 112 and bringing with the cutter 108, the undesired plant 114. The user can also continue rotating the cutter 108 while below the soil 112 at a first position in the soil 112 that is approximately equal to the depth of the undesired plant 114. The user may then move the cutter 108 into the undesired plant 114 to pulverize the undesired plant.

For comparatively smaller weeds, the cutter 108 can be placed directly above the undesired plant 114 as opposed to set at the side of the undesired plant 114 (as for larger weeds) and then operated as described above. As such, the methods and apparatus disclosed herein are advantageously applicable to large weeds and small weeds.

Existing weed removers tend to, at times, encounter debris that winds around the tool. If such a scenario occurs when using the embodiment disclosed herein, a user may reverse the direction of the power tool 102 to loosen the debris that has wound around the shaft 106, such that the user can remove the debris from the shaft 106 by hand and/or otherwise (e.g., with another tool) when the power tool 102 is stopped. If a larger weed or thicker debris wraps around the shaft 106, a user may remove the shaft 106 from the chuck 104 such that the user can slide the debris off the end of the shaft 106.

FIG. 3 is a side detail view 300 of shaft 106, the cutter 108 and the stabilizer 110 of FIG. 1. The shaft 106 has a first end and a second end. The first end of the shaft 106 is configured to be attached to a rotatable chuck as shown in FIG. 1 or FIG. 2. The second end of the shaft 106 is attached to the cutter 108. In the embodiment of FIG. 3, the shaft 106 is a long, round, steel rod that is attached to the cutter 108 and the stabilizer 110. If desired, the shaft 106 may have any other cross-sectional shape (e.g., rectangular, triangular, hexagonal, octagonal, etc.) as opposed to round.

In the illustrated embodiment of FIG. 3, the shaft 106 is a fixed length that allows most users to stand when operating the hand drill 102 to which the shaft 106 is attached. However, in additional or alternative embodiments, multiple lengths of the shaft 106 may be available. For example, the manufacturer of the shaft 106 may offer multiple categories of shafts with varying rod lengths (e.g., a category with rod length that is targeted toward comparatively shorter users, a category with rod length that is targeted to comparatively average height users, a category with rod length that is targeted to comparatively taller users, etc.).

In some embodiments, the shaft 106 may be part of a modular system. For example, the shaft 106, the cutter 108, and the stabilizer 110 may comprise a module that can be attached and/or detached from a generic shaft that interfaces with the power tool 102. In this manner, a user can attach and/or detach different modules to the generic shaft to increase the utility of the rotary weed extractor 100.

In the illustrated embodiment of FIG. 3, the first face of the cutter 108 is attached to the second end of the shaft 106. For example, the first face of the cutter 108 is attached to the second end of the shaft 108 by a first weld approximately centered with the first face of the cutter 108. In additional or alternative embodiments, the first face of the cutter 108 is attached to the second end of the shaft 108 via riveting, soldering, brazing, among other joining techniques. The second face of the cutter 108 is attached to the stabilizer 110. In additional or alternative embodiments, the first face of the cutter 108 and the second face of the cutter 108 form a hexagram. As such, the cutter 108 is implemented by a flat, multi-pointed, star shaped piece of steel. In the embodiment of FIG. 3, the cutter 108 is comparatively thinner than the shaft 106 and the cross-section of the stabilizer 110. However, the thickness of the cutter 108 may vary.

In some embodiments, the first face of the cutter 108 and the second face of the cutter 108 may form a shape including a different number of vertices than six. However, one of ordinary skill in the art should consider the impact of varying the number of vertices of the shape formed by the first face of the cutter 108 and the second face of the cutter 108. Decreasing the number of vertices of the shape formed by the first face of the cutter 108 and the second face of the cutter 108 can increase the lateral undulation of the cutter 108 in the ground. Alternatively, increasing the number of vertices of the shape formed by the first face of the cutter 108 and the second face of the cutter 108 can clog the cutter 108 reducing its effectiveness.

In some embodiments, the width and height of the cutter 108 may vary. For example, the cutter 108 may be wider, thinner, longer, and/or shorter. Also, the diameter of the cutter 108 may vary. However, one of ordinary skill in the art should consider the impact of varying the diameter of the cutter 108. For example, decreasing the diameter of the cutter 108 can reduce the effectiveness of the cutter 108 on comparatively large undesired plants. Alternatively, increasing the diameter of the cutter 108 can reduce the effectiveness of the cutter 108 on comparatively smaller undesired plants.

In the illustrated embodiment of FIG. 3, the base of the stabilizer 110 is attached to the second face of the cutter 110, such as by a second weld approximately centered with the second face of the cutter 108. In additional or alternative embodiments, the base of the stabilizer 110 may be attached to the second face of the cutter 108 via riveting, soldering or brazing, among other known joining techniques. In the embodiment of FIG. 3, the stabilizer 110 comprises a flat pointed piece of steel that has a cross-section of an isosceles triangle. However, in additional or alternative embodiments, the stabilizer 110 may have different dimensions. For example, the stabilizer 110 may be wider, thinner, longer, and/or shorter. In additional or alternative embodiments, the stabilizer 110 is implemented by a flat pointed piece of steel that has a cross-section that reflects an equilateral triangle including the base of the stabilizer 110.

Referring to FIG. 3, the shaft 106 advantageously allows the cutter 108 and the stabilizer 110 to be rotated by a power source 102. Additionally, the length of shaft 106 advantageously allows users to stand when effectively using the cutter 108. The cutter 108, when rotated, cuts into the soil 112 to get under an undesired plant to access the roots of the undesired plant. The stabilizer 110 functions to deter the cutter 108 from bouncing and/or otherwise undulating laterally in the ground. Additionally, the stabilizer 110 cuts into the ground when being rotated through soil.

FIG. 4 is a bottom view 400 illustrating the cutter 108 and the stabilizer 110 of FIG. 1 and FIG. 3. In FIG. 4, the cutter 108 comprises a multi pointed, star shaped piece of steel. Additionally, in FIG. 4, the stabilizer 110 is implemented by a flat pointed piece of steel or other suitable metal or strong composite material. In FIG. 4, the cutter 108 and the stabilizer 110 are attached by a first weld 402 approximately centered with the second face of the cutter 108 and concentric to the shaft 106. The stabilizer 110 is comparatively thinner than the cutter 108. However, in some embodiments, the thickness of the stabilizer 110 may vary.

Figure 5:
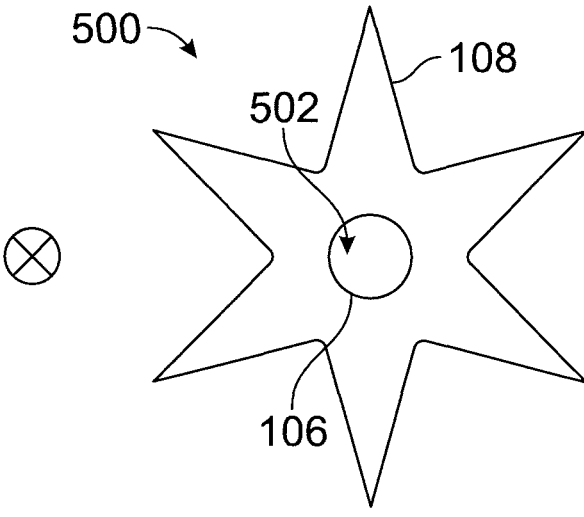
FIG. 5 is top-side view illustrating the shaft and cutter of FIG. 1 and/or FIG. 3.

FIG. 5 is top view 500 of shaft 106 and cutter 108 of FIG. 1 and FIG. 3. In FIG. 5, the second end of the shaft 106 and the first face of the cutter 108 are attached by a first weld 502 approximately centered with the first face of the cutter 108. In the embodiment of FIG. 5, the first weld 502 is concentric to the stabilizer 110.

Figure 6:
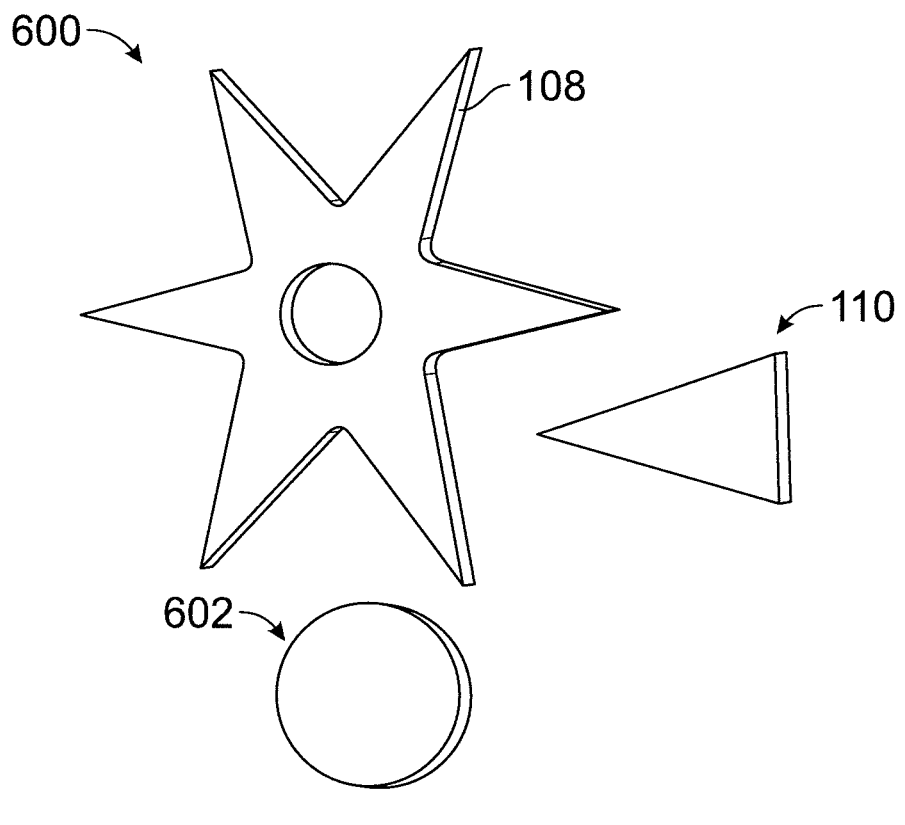
FIG. 6 is a perspective view of the shaft, cutter, and stabilizer of FIG. 1 and FIG. 3.

FIG. 6 is a perspective assembly view 600 of shaft 106, cutter 108, and stabilizer 110 of FIG. 1 and FIG. 3. The first weld 602 is visible at approximately the center of the second face of the cutter 108. Additionally, cutter 108 and the stabilizer 110 are comparatively thinner than the shaft 106. However, in some embodiments, the thickness of the cutter 108 and/or the thickness of the stabilizer 110 may vary.

Another use of the rotary weed extractor of the present disclosure is to enter the rotating cutter at an angle into the ground and drag the cutter while still in the ground toward the operator to remove a series of weeds.

From the foregoing, it is apparent that embodiments disclosed herein provide a method and apparatus for extracting one or more undesirable weeds or plants from the soil. For example, the disclosed embodiments include an apparatus that is designed to cut through soil to get beneath a root. The illustrated apparatus includes a flat, multi-pointed, star or other shaped cutter that is structured to access the root of a desired plant to remove the full undesired plant from the soil and/or to shear the undesired plant into relatively small pieces. A user can angle the rod 106 at the side of an undesired plant to be removed. The user then rotates the drill to get the cutter 108 under the root of the undesired plant such that substantially all of the undesired plant can be removed as one piece. As such, an additional benefit of the disclosed method and apparatus is improved cleanup, because the number of plant bits that are dispersed into the yard during undesired plant removal is substantially reduced.

Although certain methods and apparatus have been disclosed herein, the scope of this disclosure is not limited thereto. Instead, this disclosure covers all methods and apparatus fairly falling within the scope of the appended claims.

I claim:

1. An apparatus to extract one or more weeds from the soil comprising:

a shaft including a first end and a second end, the first end of the shaft configured to be attached to a rotatable chuck;

a cutter including a first face and an opposed second face, the first face attached to the second end of the shaft, the first face and the second face forming a flat regular shape including a plurality of vertices extending in a plane perpendicular to the shaft and configured to cut at an angle during operation; and a stabilizer including a base, the base of the stabilizer attached to the second face of the cutter, the stabilizer having a triangular cross-section.

2. The apparatus of claim 1, further including:

a power source attached to the first end of the shaft via the rotatable chuck, the power source configured to rotate the shaft, the rotatable chuck, the cutter, and the stabilizer; and a housing supporting the power source, the power source being rotatable within the housing.

3. The apparatus of claim 1, wherein:

the first face of the cutter is attached to the second end of the shaft by a first weld approximately centered with the first face of the cutter; and the base of the stabilizer is attached to the second face of the cutter by a second weld approximately centered with the second face of the cutter.

4. The apparatus of claim 1, wherein the first face of the cutter and the second face of the cutter form a hexagram.

5. The apparatus of claim 1, wherein the first face of the cutter and the second face of the cutter form a Marian star.

6. The apparatus of claim 1, wherein the triangular cross-section corresponds to an isosceles triangle.

7. The apparatus of claim 1, wherein the triangular cross-section corresponds to an equilateral triangle including the base of the stabilizer.

8. A method for extracting one or more weeds from the soil, the method comprising:

controlling a housing supporting a power source, the power source attached to a shaft via a rotatable chuck, the shaft including a first end attached to the rotatable chuck and a second end;

placing a cutter into soil at an angle, the cutter including a first face and a second face, the first face of the cutter attached to the second end of the shaft, the first face and the second face forming a regular shape including a plurality of vertices;

rotating the cutter into the soil until the cutter is at a first position in the soil including one of below a depth of a plant or approximately equal to the depth of the plant;

deterring, using a stabilizer, the cutter from moving laterally within the soil, the stabilizer including a base, the base of the stabilizer attached to the second face of the cutter, the stabilizer having a triangular cross-section; and rotating the cutter one of under a root of the plant and removing the cutter from the soil with the plant or adjacent to the plant to pulverize the plant.

9. The method of claim 8, wherein:

the first face of the cutter is attached to the second end of the shaft by a first weld approximately centered with the first face of the cutter; and the base of the stabilizer is attached to the second face of the cutter by a second weld approximately centered with the second face of the cutter.

10. The method of claim 8, wherein the first face of the cutter and the second face of the cutter form a hexagram.

11. The method of claim 8, wherein the first face of the cutter and the second face of the cutter form a Marian star.

12. The method of claim 8, wherein the triangular cross-section corresponds to an isosceles triangle.

13. The method of claim 8, wherein the triangular cross-section corresponds to an equilateral triangle including the base of the stabilizer.

14. A system to extract one or more weeds, the system comprising:

a power source attached to a battery;

a rotatable chuck attached to the power source;

a housing supporting the power source and the rotatable chuck;

a shaft including a first end and a second end, the first end of the shaft attached to the rotatable chuck;

a cutter including a first face and a second face, the first face of the cutter attached to the second end of the shaft, the first face and the second face forming a flat regular shape including a plurality of vertices extending in a plane perpendicular to the shaft and configured to cut at an angle during operation; and a stabilizer including a base, the base of the stabilizer attached to the second face of the cutter the stabilizer having a triangular cross-section.

15. The system of claim 14, wherein the power source is configured to rotate the shaft, the rotatable chuck, the cutter, and the stabilizer.

16. The system of claim 14, wherein:

the first face of the cutter is attached to the second end of the shaft by a first weld centered with the first face of the cutter; and the base of the stabilizer is attached to the second face of the cutter by a second weld centered with the second face of the cutter.

17. The system of claim 14, wherein the first face of the cutter and the second face of the cutter form a hexagram.

18. The system of claim 14, wherein the first face of the cutter and the second face of the cutter form a Marian star.

19. The system of claim 14, wherein the triangular cross-section corresponds to an isosceles triangle.

20. The system of claim 14, wherein the triangular cross-section corresponds to an equilateral triangle including the base of the stabilizer.

\*　　\*　　\*　　\*　　\*